(No Model.)
R. PIERPONT.
FEEDING DEVICE FOR SEWING MACHINES.
No. 575,984. Patented Jan. 26, 1897.
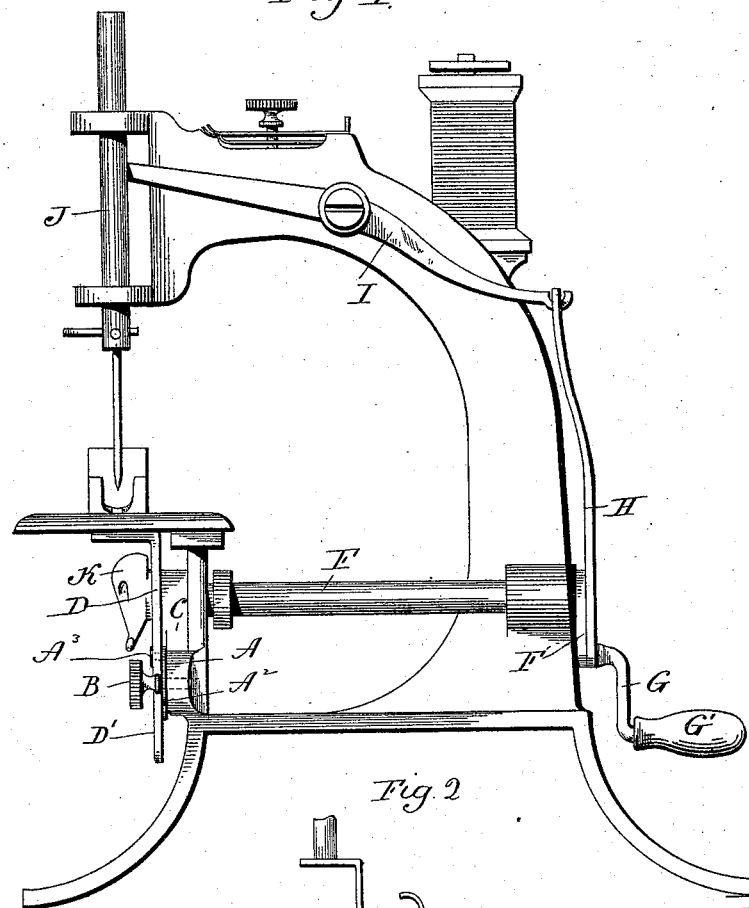
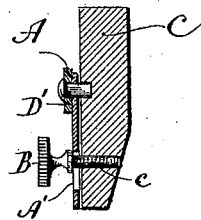
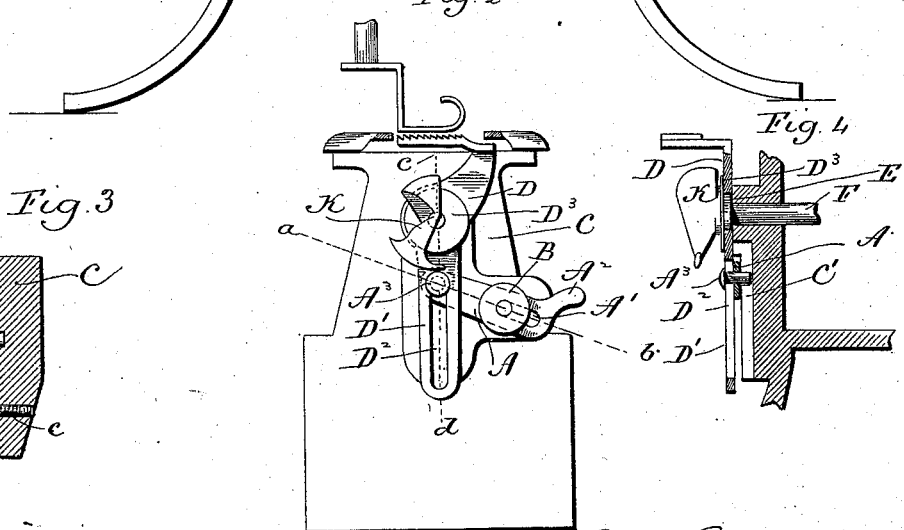
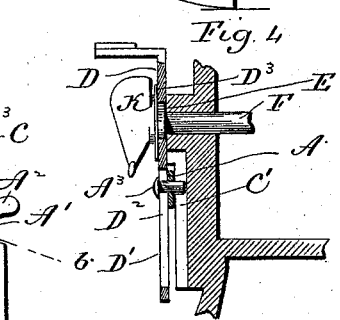
Witnesses.
Robert Pierpont
Inventor.
By attys
Earle Seymour

UNITED STATES PATENT OFFICE.

ROBERT PIERPONT, OF NEW HAVEN, CONNECTICUT, ASSIGNOR TO
J. WILLIS DOWNS, OF SAME PLACE.

FEEDING DEVICE FOR SEWING-MACHINES.

SPECIFICATION forming part of Letters Patent No. 575,984, dated January 26, 1897.

Application filed December 23, 1895. Serial No. 573,058. (No model.)

*To all whom it may concern:*

Be it known that I, ROBERT PIERPONT, of New Haven, in the county of New Haven and State of Connecticut, have invented a new Improvement in Feeding Devices for Sewing-Machines; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of one form which a sewing-machine provided with my invention may assume; Fig. 2, a broken view thereof in front elevation; Fig. 3, a diagonal sectional view on the line $a\,b$ of Fig. 2; Fig. 4, a vertical sectional view on the line $c\,d$ of Fig. 2.

My invention relates to adjustable feeding devices for sewing-machines, the object being to produce, at a low cost for manufacture, an adjustable feeding device in which the number of parts is reduced to the minimum, and in which the adjustment is so simple as to be readily effected by an unskilled person, as by a servant or child.

With these ends in view my invention consists in an adjustable feeding device having certain details of construction and combinations of parts, as will be hereinafter described, and pointed out in the claim.

For the purpose of illustrating my invention I have shown its application to an extremely simple sewing-machine designed to be operated by hand, but I would have it understood that I hold myself at liberty to apply it to all kinds of sewing-machines in which it may be used.

In carrying out my invention I employ an adjustable fulcrum-lever A, constructed at its outer end with a longitudinally-arranged slot A', receiving the stem of a binding-screw B, the said stem entering a threaded horizontal hole $c$, formed in the machine-frame C. The said outer end of the said lever is also furnished with an operating handle or arm $A^2$, which projects sufficiently beyond the machine-frame, as shown in Fig. 2, to permit the turning of the lever upon the binding-screw B as upon a fulcrum for the depression or elevation of its inner end. The said inner end of the lever is furnished with a pin $A^3$, which constitutes the center upon which the feed-plate D oscillates, the said plate being constructed with a long downwardly-depending arm D', containing a longitudinally-arranged vertical slot $D^2$, which the said pin enters. The inner end of the pin enters a guideway consisting of a vertical slot C', formed in the machine-frame, as shown in Fig. 4. The said feed-plate is constructed with a cam-opening $D^3$, receiving an operating-cam E, secured to the forward end of the main driving-shaft F, which has bearing in the frame and is provided at its rear end with a crank F', to which the shank G of the handle G' is attached.

A pitman H, connected with the shank G of the handle at its lower end, is connected at its upper end with the operating-lever I, the opposite end of which is engaged with the needle-bar J, which is of any approved construction.

A looping-hook K is attached to the extreme outer end of the driving-shaft, as shown in Fig. 4. It will be readily understood that when the said shaft is rotated, the feed-plate D will be oscillated upon the pin $A^3$ as upon a center and that the degree of its oscillation will depend upon the position of the pin $A^3$. The greater the range of its movement in oscillation the coarser the feed, and vice versa. Thus if it is desired to sew with a coarse stitch the binding-screw B is loosened and the operating-arm $A^2$ of the fulcrum-lever A engaged and depressed, whereby the inner end of the lever is elevated, let it be said, to the upper end of the slot $D^2$ in the arm D' of the feed-plate D, as shown in Fig. 2. The binding-screw B is then tightened, so as to hold the lever firmly in place. The machine will now sew with the coarsest stitch of which it is capable, inasmuch as the feed-plate will move through the longest possible arc when oscillated by the cam E of the main driving-shaft F. On the other hand, if it is desired to sew with the finest stitch of which the machine is capable of sewing, the binding-screw is loosened and the arm $A^2$ engaged and lifted, whereby the inner end of the lever is depressed and the pin $A^3$ carried to the bottom of the slot $D^2$, after which the binding-screw is tightened to hold the lever in place. Then when the machine is operated the feed-plate will be oscillated through the shortest possible arc, and the machine will sew finer. It will of course be understood that the lever A may be set so that the pin $A^3$ will occupy any intermediate position between the two ends of the slots $D^2$ and so that the stitch may be regulated in length to all lengths between the longest and shortest lengths of stitch the machine is capable of sewing.

It is apparent that in carrying out my invention some changes from the construction herein shown and described may be made. I would therefore have it understood that I do not limit myself to such form, but hold myself at liberty to make such changes as fairly fall within the spirit and scope of my invention.

Having fully described my invention, what I claim as new, and desire to secure by Letters Patent, is—

In an adjustable feeding device for sewing-machines, the combination with a part of the machine formed with a vertical guideway, of a vertically-arranged oscillating feed-plate constructed with a longitudinal slot and with a cam-opening located at a point above the said slot, a main driving-shaft, a cam secured to the said shaft and located in the said cam-opening in which it revolves for the oscillation of the feed-plate, means for operating the said shaft, a looping-hook connected with the extreme outer end of the shaft in front of the said cam, an adjustable fulcrum-lever provided with a pin entering the slot in the plate and constituting the center upon which the same oscillates, and also entering the said guideway, and means for fixing the said fulcrum-lever in any position within the range of its adjustment, substantially as described.

In testimony whereof I have signed this specification in the presence of two subscribing witnesses.

ROBERT PIERPONT.

Witnesses:
 FRED C. EARLE,
 LILLIAN D. KELSEY.